United States Patent Office 3,055,842
Patented Sept. 25, 1962

3,055,842
CATALYST AND METHOD OF PREPARING SAME
Warn D. Robinson, Webster Groves, Mo., assignor to Monsanto Chemical Company, St. Louis, Mo., a corporation of Delaware
No Drawing. Filed Mar. 23, 1959, Ser. No. 800,909
12 Claims. (Cl. 252—461)

This invention relates to the catalytic oxidation of organic compounds and more particularly to the vapor phase catalytic oxidation of organic compounds in the preparation of organic dicarboxylic acids and anhydrides, such as maleic acid, maleic anhydride, phthalic acid and phthalic anhydride.

The principal objects of this invention are to provide an improved vanadium containing catalyst for the vapor phase oxidation of organic compounds to maleic acid and/or maleic anhydride, such as the oxidation of, for example, the butanes, the butenes, the pentanes, the pentenes, the hexanes, the heptanes, the heptenes, the octanes and the octenes, cyclopentane, cyclopentene, cyclohexane, cyclohexene, benzene, toluene, phenol, crotonaldehyde, crotonic acid, furan, furfuryl alcohol, furfural, oxymethyl furfural and turpentine oil to maleic acid and/or maleic anhydride; and for the vapor phase oxidation of such organic compounds to phthalic acid and/or anhydride as, for example, the oxidation of naphthalene, the xylenes, phenanthrene, indene and bicyclononadienes, among others. The vapor phase oxidation of the above organic compounds to dicarboxylic acids and/or anhydrides is well known to those skilled in the art.

The vapor phase catalytic oxidation of the above organic compounds is accomplished by a process in which a gaseous reaction mixture of the organic compound and an oxygen-containing gas is passed in contact with a catalyst contact mass containing metallic oxides. This vapor phase oxidation process is well known to those skilled in the art and many metallic oxides have been suggested as catalysts for use in such processes either alone or in various combinations. The oxidation of materials oxidizable to maleic acid or anhydride and phthalic acid or anhydride has presented problems not encountered in the catalytic formation of other organic materials. A number of catalytic materials proposed for the oxidation of other organic materials such as the oxidation of alcohols to acids are active to some degree to promote the oxidation of, for example, benzene to maleic anhydride or naphthalene to phthalic anhydride. However, the yields obtained of maleic anhydride or phthalic anhydride are too low and either an excessive proportion of the oxidizable material passes unchanged or is completely oxidized to carbon dioxide and water. Also in the case of the vapor phase oxidation of benzene, some proposed catalyst combinations result in the formation of excessive quantities of lower aliphatic acids.

Chief among the catalysts successfully employed in the oxidation of materials oxidizable to maleic acid and anhydride and phthalic acid and anhydride are molybdenum and vanadium which are usually employed in the form of their oxides. Often other materials are added to increase the effectiveness of molybdenum or vanadium. Catalyst materials containing vanadium or molybdenum together with other promoters, stabilizers or the like, are many times referred to as vanadium or molybdenum catalysts depending, of course, on the major component of the material. For example, a two-component mixture containing more than 50% vanadium is referred to as a vanadium catalyst. Likewise, a three-component catalyst containing 40% or more vanadium and 30% or less of each of the other components is referred to as vanadium catalyst. This invention pertains to vanadium-containing catalysts including such catalysts in which vanadium is the only metal component as well as those in which vanadium is a major as well as a minor component and a method for preparing these catalysts especially for use in processes for preparing maleic anhydride and/or acid and phthalic anhydride and/or acid by the controlled vapor phase oxidation of materials oxidizable to maleic acid and/or anhydride and materials oxidizable to phthalic anhydride and/or acid with an oxygen-containing gas.

Generally the catalytic mixture is supported on some inert base or support which acts as a distender. These bases are generally much lower in cost than the metallic components of the catalyst and hence help reduce the cost of the resulting catalytic contact mass. Also, since the efficiency of the catalyst sems to be to some extent a function of the surface area the inert base or support gives the catalytic contact mass a greater surface area than that otherwise would be possessed by the catalyst. Impregnating a porous inert support with a catalytic material in such a manner as to provide a porous catalytic contact mass also enhances the efficiency of the catalytic mixture by exposing a maximum of active surface area to the gaseous reaction mixture.

A common method of preparing a vanadium oxide-containing catalytic contact mass is to coat and/or impregnate particles of the inert carrier support with a solution containing a vanadium catalytic composition which can be readily converted to the oxide or oxides of vanadium. The carrier thus treated is heated to remove the solvent and thereby produce a coating of the vanadium-containing catalyst on and in the carrier. The vanadium-containing composition is then converted chemically to the oxide or oxides of vanadium. When a promoter or stabilizer is to be employed with vanadium they are added to the solution containing the vanadium compound and the entire mixture employed to coat or impregnate the carrier. When such promoter or stabilizer materials are employed the resulting catalyst on the carrier is generally a mixture of oxides. Various catalytic contact masses heretofore disclosed as being useful to promote vapor phase oxidation of materials oxidizable to maleic acid and/or anhydride and phthalic acid and/or anhydride result in yields which are not satisfactory, usually ranging from about 33% to about 40% of the amount of the acid or anhydride theoretically obtainable from the organic material being oxidized. For example, when the catalytic contact masses heretofore disclosed are employed in the oxidation of benzene the yield of maleic acid per 100 pounds of benzene charged is about 50 to about 60 pounds after a period of stabilized oxidation condition is obtained. Some catalytic contact masses heretofore proposed produce a higher initial yield but very readily degenerate in a matter of a relatively short time to the yields described above. It is readily apparent that the various catalytic contact masses heretofore proposed are highly inefficient.

It has also been proposed that an improved catalytic contact mass containing vanadium oxides can be prepared by treating the vanadium-containing mixture of metallic compounds with sulfur dioxide to reduce the vanadium, molybdenum and other metallic compounds and therefore prepare a catalytic contact mass containing the various metallic compounds in different valence states.

According to the present invention it has been found that vanadium-containing catalysts can be prepared by adding an ammonium sulfate such as ammonium sulfate or ammonium acid sulfate, to a catalyst mixture comprising vanadium compounds convertible to oxides of vanadium upon heating. The resulting mixture is then employed as a solution or paste or dispersion to coat and/or impregnate the carrier particles. The coated and/or impregnated particles are then heated, in the presence of an oxygen containing gas, preferably air, and in some cases even in the presence of inert gases, to a temperature which is sufficient to convert the vanadium and the other metallic compounds present, if any, to their respective oxides of suitable catalytic activity, but below the melting point temperature of the catalyst mixture. The vanadium-containing catalysts, which can be prepared by the process of this invention, include catalysts containing oxides of vanadium and preferably those containing oxides of vanadium, in the amount represented by the atomic percent of vanadium present based on the total metals present of from 10 to 95 percent vanadium, together with oxides of other metals which are promoters and/or stabilizers of vanadium or for which oxides of vanadium perform as promoters or stabilizers.

It has also been discovered that the use of catalysts of this invention in the controlled vapor phase oxidation of materials oxidizable to maleic acid and/or anhydride and phthalic acid and/or anhydride with an oxygen containing gas, such as air, air enriched with oxygen and the like, at elevated temperatures, e.g., of from 300 to 600° C., preferably from 400° to 500° C. and at a pressure of from atmospheric pressure to elevated pressures up to 50 pounds per square inch or higher, results in production of exceptionally high yields of maleic anhydride and/or acid and phthalic acid and/or anhydride for many thousands of hours of continuous operation. By employing the catalyst of this invention in the vapor phase oxidation of materials oxidizable to maleic anhydride and/or acid and materials oxidizable to phthalic anhydride and/or acid, and especially hydrocarbons oxidizable to maleic anhydride or phthalic anhydride, high yields, i.e. yields of from 60% to 75% of the theoretical yield, can be achieved.

The catalytic compositions of this invention containing vanadium do not possess the objectionable properties possessed by the metallic oxide catalysts heretofore employed. Rather, the catalyst of this invention is exceedingly stable, is far more active and its activity is constant over long periods of continuous use. The catalyst contact masses produced from the catalyst of this invention possess physical and catalytic stability greater than that which was possible to achieve from the catalysts heretofore proposed for the oxidation of benzene to maleic anhydride or for the oxidation of naphthalene to phthalic anhydride.

Suitable vanadium compounds convertible to oxides of vanadium upon heating include the salts of vanadium such as those in which vanadium is in the cationic portion of the molecule, e.g. vanadyl sulfate, vanadyl chloride, vanadium mono-oxychloride, etc. as well as those in which vanadium is in the anionic portion of the molecule, e.g. ammonium vanadate (ammonium metavanadate) nickel vanadate, calcium vanadate, etc.; and such metal containing organic chemical compounds as amine salts of vanadic acid, amidine salts of vanadic acids, esters of vanadic acids and vanadium salts of organic acids. Specific vanadium containing organic chemical compounds include but are not limited to vanadium lactate, cyclohexyl vanadate, benzyl vanadate, guanidine vanadate and diphenyl guanidine vanadate.

Of the above vanadium compounds the inorganic salts are preferred and ammonium vanadate is especially preferred.

In the preparation of catalytic contact masses, hereinafter referred to as catalytic mass, according to this invention it is desirable to support the catalyst compositions of this invention upon some mechanically strong and chemically inert body which has the combined effect of greatly extending the exposed surface of the catalyst and functioning as the support thereof to prevent mechanical disintegration of the catalyst into dust.

Among the substances which have been suggested as catalyst carriers are the following: ordinary unglazed porcelain, pumice and asbestos. Also with respect to catalytic inactivity toward chemical reactions and resistance to fusion by heat, silica in a porous form is recognized as being of exceptional merit as a catalyst carrier. Any of these other inert materials such as for example, quartz fragment, alumina particles, corundum particles, diatomaceous stones, silicon carbide shaped as cylinders and spheres, as well as irregularly shaped particles, among others, can be employed as a carrier for the catalyst of this invention. There also may be employed, as carriers for the catalyst of this invention, metallic chips, turnings and shaped metallic forms prepared from thin strips of metal shaped into cylindrical or semi-cylindrical shapes, V-shape, U-shape or any similar form used as packings in fractionation columns. Obviously the metal should have a melting point sufficiently above the temperatures involved in the vapor phase oxidation so that the physical properties of the metal do not deteriorate to such a point that the entire catalytic mass becomes fused into a single impervious mass. Many of the steels, including stainless steel, are useful in the preparation of small shaped pieces useful as carriers for the catalysts of this invention. Successful coating of these small metallic pieces can be accomplished if, in addition to the metallic piece having a regular or irregular geometric form, the metallic pieces also have a dimpled surface, punched, or pertused holes or some other means for providing numerous irregularities as an anchor for the catalytic coating. The size and number of the irregularities or holes is not important and the holes, if such are used as anchors, need not exist after the catalytic coating is fused to the carrier. However, no deleterious effects will be encountered if the fused catalyst does not seal off the holes. In many cases metals which per se are deleterious to the vapor phase oxidation can be employed as the carrier providing a continuous fused surface of catalytic materials is provided thereon.

The catalytic materials of this invention may be applied to the carrier particles hereinbefore described in any convenient manner. One method involves forming a solution or a dispersion containing ammonium sulfate and a salt of vanadium together with other metallic components such as the promoting and stabilizing materials. Thereafter the resulting solution or dispersion is applied to the carrier particles by submersing or dipping them into the solution or dispersion to give a highly intimate and permanent association between the mixture of the metallic compounds and the carrier. A second method which may be conveniently employed is merely dusting carrier particles which have been previously saturated with water, with the catalytic mixture in a finely divided pulverulent state. A third and preferred method which can be employed involves preparing an aqueous paste comprising ammonium sulfate and a water soluble salt of vanadium together with the salts and/or oxides of the stabilizer or promoter metals so that the paste contains these catalytic metals in the desired proportions. There is then mixed with said paste the carrier particles in such suitable equipment to provide a uniform deposit of the catalytic materials on the carrier particles. When any of these methods are employed the catalyst may be caused to enter the pores of the porous carriers and thus may be intimately bonded thereto or in the case of the metal carriers a sufficiently thick layer of the mixture containing the catalytic materials is deposited on the metal surface and caused to adhere thereon by evaporating the solvent or water thereby forming a dry coating. A fixed intimate bond is thereafter obtained by heating the coated carrier in a second heat treating process at a temperature sufficient to convert the compounds of vanadium, and other metals to their oxides. As hereinbefore stated, this may be accomplished in the presence of air, oxygen containing gas or even in the presence of inert gases, especially where the salts of vanadium and other metals will readily break down to the corresponding oxides merely on heating and require no oxygen to convert them to the desired oxides, e.g. ammonium vanadate may be converted to vanadium pentoxide by heating in an inert atmosphere.

The following examples are illustrative of the process of the invention and are not to be construed as limitations thereon.

EXAMPLE 1

An aqueous slurry, made alkaline by the addition of 100 parts (28% $NH_3$) ammonium hydroxide, containing 3.9 grams of titanium dioxide, 9.5 grams of ammonium paramolybdate, 51 grams of ammonium vanadate and 150 parts water, and about 22 grams of ammonium sulfate (50.5 gms. per mole of vanadium) is stirred and heated to 80° C. on a steam bath. The resulting hot mixture together with 250 cc. of 0.16 inch diameter silica pellets are slowly mixed together until the coated pellets are uniformly coated and appear dry. The coated pellets are air dried. This catalyst mass is suitable for a fixed bed catalyst converter.

EXAMPLE 2

An alkaline paste is prepared from 3.9 grams titanium dioxide, 9.5 grams ammonium paramolybdate, 51 grams of ammonium vanadate, 15 grams ammonium sulfate (34.5 gms. per mole of vanadium) and 250 grams of aqueous solution containing 28 grams ammonia. This paste is stirred and heated to 80° C. on a steam bath. There is added to this hot mixture 250 cc. pumice fragments having a particle size of from 6 to 8 mesh (U.S. standard sieve size). The resulting mass is stirred and heated until the pumice fragments are coated and the coated fragments appear dry. The coated fragments are further dried with hot air. This catalyst is more suitable for use as a fluid bed catalyst mass.

EXAMPLE 3

An alkaline paste is prepared from 3.9 grams titanium dioxide, 9.5 grams ammonium paramolybdate, 33 grams ammonium sulfate (75.8 gms. per mole of vanadium), 51 grams ammonium vanadate and 250 grams of an aqueous solution containing 28 grams ammonia. This mixture is stirred and heated on a steam bath together with 250 cc. quartz fragments having a particle size of ⅛ to ¼ inch until the particles are coated and the resulting coat appears dry. The coated fragments are further dried with hot air. This catalyst is useful in a fixed bed and especially in a fixed bed with tray converters.

EXAMPLE 4

An alkaline paste is prepared from 3.9 grams titanium dioxide, 9.5 grams ammonium paramolybdate, 51 grams ammonium vanadate, 45 grams of ammonium sulfate (103.5 gms. per mole of vanadium) and 250 grams of an aqueous solution containing 12% by weight ammonia. This mixture is stirred and heated on a steam bath together with 250 cc. alumina particles having a particle size of from ⅟₁₆ to ⅜ inch until the particles are coated and the resulting coat appears dry. The coated fragments are further dried with hot air. This catalyst is useful in a fixed bed and especially in a fixed catalyst bed in a tray converter, that is, a catalytic converter having a shallow catalyst bed of, say, 1 inch to 5 inches in depth and having a cross section of from 5 to 50 square feet or more and may contain more than one of such tray of catalyst.

EXAMPLE 5

An alkaline paste is prepared from 3.9 grams titanium dioxide, 9.5 grams ammonium paramolybdate, 51 grams ammonium vanadate, 51 grams ammonium sulfate (117.3 gms. per mole of vanadium) and 250 parts of an aqueous solution containing 14% by weight ammonia. This mixture is stirred and heated on a steam bath together with 250 cc. diatomaceous stones having a particle size of from ⅜ to ½ inch until the particles are coated and the resulting coat appears dry. The coated fragments are further dried with hot air. This catalyst is useful in a fixed bed and especially in a fixed bed in a tray converter.

EXAMPLE 6

An alkaline paste is prepared from 3.9 grams titanium dioxide, 9.5 grams ammonium paramolybdate, 51 grams ammonium vanadate, 60 grams ammonium sulfate (138 gms. per mole of vanadium) and 200 grams of an aqueous solution containing 14% ammonia. This mixture is stirred and heated on a steam bath together with 250 cc. asbestos fibers until the particles are coated and the resulting coat appears dry. The coated fragments are further dried with hot air. This catalyst is useful in a fixed bed and especially in a fixed bed in a tray converter.

EXAMPLE 7

An alkaline paste is prepared from 3.9 grams titanium dioxide, 9.5 grams ammonium paramolybdate, 51 grams ammonium vanadate, 65 grams ammonium sulfate (149.5 gms. per mole of vanadium) and 200 grams of an aqueous solution of ammonium hydroxide containing 14% $NH_3$. To this mixture is added 250 cc. of porous carrier particles of silica and refractory glass in the form of small cylinders having an axis of about 0.16 inch in length and 0.16 inch in diameter, hereinafter referred to as 0.16 inch pellets. The mixture of salts and 0.16 inch pellets is stirred and heated on a steam bath until the pellets are coated and the resulting coat appears dry. The coated pellets are further dried with hot air. This catalyst is useful in a fixed bed in long packed tubes since the pressure drop through the catalyst mass in the tube is very low.

The catalyst coatings described in Examples 1 through 7 all contained the metals present in the proportions of 81 atomic percent vanadium, 10 atomic percent molybdenum, and 9 atomic percent titanium. In the examples to follow, the catalytic coating will be described in terms of the atomic percentages of metals present.

EXAMPLE 8

A catalyst mass containing 74 atomic percent vanadium, 18 atomic percent molybdenum, and 8 atomic percent titanium is prepared by stirring 0.16 inch pellets with an alkaline paste prepared from ammonium vanadate, ammonium paramolybdate, titanium oxide, aqueous ammonia and ammonium sulfate. The amount of ammonium sulfate used is about 65 parts by weight per mole of vanadium.

EXAMPLE 9

An aqueous alkaline paste is prepared containing, in addition to water, ammonia, ammonium sulfate (150 parts by weight per mole vanadium), ammonium vanadate, ammonium paramolybdate and titanium oxide so the atomic percentages of the metals are: vanadium 85.4%, molybdenum 5%, and titanium 9.6%. This paste together with quartz fragments are stirred and heated on a steam bath until the fragments are coated and the coating appears dry.

EXAMPLE 10

An aqueous alkaline paste is prepared containing, in addition to water, ammonia, ammonium sulfate (100 parts by weight per mole vanadium), ammonium vanadate, ammonium paramolybdate and titanium oxide so the atomic percentages of the metals are: vanadium 77.3%, molybdenum 14%, and titanium 8.7%. This paste together with quartz fragments are stirred and heated on a steam bath until the fragments are coated and the coating appears dry.

EXAMPLE 11

An aqueous alkaline paste is prepared containing, in addition to water, ammonia, ammonium sulfate (90 parts by weight per mole vanadium), ammonium vanadate, ammonium paramolybdate and titanium oxide so the atomic percentages of the metals are: vanadium 62%, molybdenum 30%, and titanium 8%. This paste together with quartz fragments are stirred and heated on a steam bath until the fragments are coated and the coating appears dry.

The coated catalysts described in Examples 1 through 11 can be calcined at a temperature of about 300° to about 600° C. in a muffle furnace to convert the salts of vanadium and the other metallic components to their respective oxides and charged to a converter, such as a fixed bed catalytic converter fitted with an inlet charging line for the feed mixture of hydrocarbon and oxygen containing gas (air) and a discharge line for the gaseous oxidation products, or the dried coated particles can be charged to such a fixed bed and heated to a temperature of from about 300° C. to about 600° C., while passing air, generally preheated air, through the bed of coated particles. Specifically, the catalysts of Examples 1 through 11 were converted to their respective oxides by employing the latter procedure, the temperature being within the range of 430–450° C.

The catalysts coated as described in the foregoing eleven examples are exceptionally useful in the vapor phase catalytic oxidation of benzene to maleic anhydride. There is tabulated in Table I the results of the use of some of these catalysts at various temperatures of operation. The percentage values shown for each element is atomic percent. The yield weight percent is based on the pounds of maleic acid recovered (the discharge line being connected to a water absorption system which scrubs maleic anhydride out of the discharge gases) per 100 pounds of benzene charged. These results were obtained at air to benzene ratios of about 500 cubic feet per minute of air per pound of benzene.

*Table I*
CATALYST DESCRIPTION

| From | V Percent | Mo Percent | Ti Percent | Temp., ° C. | Percent weight yield based on benzene |
|---|---|---|---|---|---|
| Example 1 | 81 | 10 | 9 | 400 | 94.0 |
| Example 8 | 74 | 18 | 8 | 420 | 90.1 |
| Example 9 | 85.4 | 5.0 | 9.6 | 410 | 80.9 |
| Example 10 | 77.3 | 14.0 | 8.7 | 410 | 90.0 |
| Example 11 | 62 | 30 | 8 | 430 | 90.8 |

The following examples tabulated in Table II illustrate the use of other catalysts prepared according to this invention. These catalysts were coated on suitable carriers. In the preparation of each of the catalyst coatings prepared according to the previous examples, the amount of ammonium sulfate employed was about 100 parts by weight per mole vanadium employed.

In preparing the catalyst of Example 29, the ammonia was omitted so that the paste was acid instead of alkaline in character. The ratio of air to benzene in these examples also is in the ratio of 450–550 c.f.m. air per pound of benzene. The weight yield in these and following examples is as defined above, that is, pounds of dicarboxylic acid recovered per 100 pounds of oxidizable material charged.

*Table II*

| Example No. | Catalyst description—Atomic percent ||||| Results from benzene oxidation ||
|---|---|---|---|---|---|---|---|
| | Percent V | Percent Ti | Percent Mo | Percent P | Percent other | Temp., ° C. | Percent weight yield |
| 12 | 70 | 8.5 | 18 | 2.0 | 1.5 Si | 440 | 100.5 |
| 13 | 72 | 7.5 | 18 | 2.5 | | 440 | 102.0 |
| 14 | 64.7 | | 32.3 | 1.0 | 2.0 Si | 475 | 92.1 |
| 15 | 63.5 | 0.5 | 32.0 | 2.0 | 2.0 Si | 460 | 101.7 |
| 16 | 31 | | 62 | 3.0 | 4 Ca | 480 | 72.4 |
| 17 | 20 | 10 | 70 | | | 460 | 76.8 |
| 18 | 90 | 10 | | | | 460 | 83.1 |
| 19 | 78.5 | 4.0 | 14.0 | 1.4 | 4.1 Ca | 430 | 96.5 |
| 20 | 78 | 10 | 10 | 1.0 | 1.0 As | 440 | 89.4 |
| 21 | 78 | 10 | 10 | 1.0 | 1.0 B | 450 | 99.4 |
| 22 | 73.5 | 10 | 15 | 1.5 | | 450 | 76.1 |
| 23 | 79 | 10 | 10 | | 1.0 Sn | 440 | 90.0 |
| 24 | 79 | 10 | 10 | | 1.0 Ce | 430 | 86.0 |
| 25 | 78.5 | 4 | 14 | 1.4 | 2.1 Ca | 440 | 100.0 |
| 26 | 80.7 | 8.0 | 10 | 1.2 | 0.1 Sb | 450 | 99.1 |
| 27 | 89.8 | 8.0 | | 1.2 | 1.0 W | 450 | 96.0 |
| 28 | 88.7 | 10.0 | | 1.2 | 0.1 Cr | 450 | 92.7 |
| 29 | 78 | 7.8 | 12 | 1.2 | 1.0 Si | 435 | 102.0 |

In Table III there appears the results obtained from the use of other catalysts of this invention. As before, only the atomic percentage of the metal elements in the catalyst coating are shown. These catalytic coatings were prepared with the amount of ammonium sulfate according to the process of this invention using 75 to 100 parts of ammonium sulfate per mole of vanadium. The air to benzene ratio was in the range of 450–550 c.f.m. per pound of benzene.

*Table III*

| Example No. | Catalyst description—Atomic percent ||||| Results from benzene oxidation ||
|---|---|---|---|---|---|---|---|
| | Percent V | Percent Ti | Percent Mo | Percent P | Percent other | Temp., ° C. | Percent weight yield |
| 30 | 88.7 | 10.0 | | 1.2 | 0.1 Zr | 450 | 83.5 |
| 31 | 80.9 | 8.0 | 8.0 | 0.8 | 0.2 Sn | 450 | 98.4 |
| 32 | 79.9 | 10 | 10 | 1.0 | 0.1 Al | 450 | 97.0 |
| 33 | 80 | 10 | 10 | | | 450 | 83.9 |
| 34 | 70 | 10 | 10 | | 10 Ni | 450 | 81.2 |
| 35 | 75 | 10 | 10 | 1 | 4.0 Fe | 450 | 91.4 |
| 36 | 70 | 10 | 10 | | 10 Sr | 450 | 85.9 |
| 37 | 79 | 10 | 10 | | 1.0 Th | 450 | 88.0 |
| 38 | 79 | | 10 | 1 | 10 U | 450 | 90.4 |
| 39 | 80 | 6.0 | 12 | 1.2 | 0.8 Cr | 475 | 103.2 |
| 40 | 65 | 6.6 | 24 | 2.4 | 2.0 Cr | 460 | 101.3 |
| 41 | 80.8 | 8.0 | 10 | 1.2 | 0.01 Pt | 440 | 90.2 |
| 42 | 80 | 10 | 10 | 1.2 | 8.8 Ta | 460 | 94.4 |
| 43 | 78 | 10 | 10 | 1.0 | 0.5 Tb | 440 | 101.0 |
| 44 | 60 | 9.5 | 30 | 0.5 | | 450 | 87.1 |
| 45 | 65.5 | 0.5 | 33 | 1 | | 460 | 101.8 |
| 46 | 67 | 9.7 | 15 | 0.8 | 7.5 Co | 460 | 80.4 |
| 47 | 62 | 9.5 | 25 | 1.5 | 2.0 Si | 460 | 96.4 |
| 48 | 74 | 9.2 | 15 | 0.8 | 1.0 Ag | 420 | 95.0 |
| 49 | 74 | 9.2 | 15 | 0.8 | 1.0 Zn | 460 | 90.4 |

The catalyst prepared according to this invention can be successfully employed for the vapor phase catalytic oxidation of other organic compounds known to be oxidizable to maleic anhydride. The following examples tabulated in Table IV show such a use of these catalytic compositions in the vapor phase oxidation of butane. These catalytic compositions were prepared as described in Examples 1 to 11.

Table IV

| Example No. | Catalyst description—Atomic percent | | | | | Results from benzene oxidation | |
|---|---|---|---|---|---|---|---|
| | Percent V | Percent Ti | Percent Mo | Percent P | Percent other | Temp., °C. | Percent weight yield |
| 50 | 51 | 5.4 | 41.3 | | 2.2 Si | 449 | 34.1 |
| 51 | 65.5 | 0.5 | 33 | 1 | | 426 | 30.5 |
| 52 | 65.5 | 0.5 | 33 | 1 | | 430 | 40.7 |
| 53 | 60 | 8 | 30 | 2 | 2 Si | 450 | 32.2 |
| 54 | 62 | 10 | 25 | 1.0 | 2.2 Si | 420 | 36.6 |
| 55 | 83.5 | 5.3 | 10 | 1.2 | | 430 | 37.7 |
| 56 | 78.9 | 10 | 10 | 1.0 | 0.1 Al | 430 | 36.7 |
| 57 | 70 | 10 | 10 | | 10 Al | 440 | 51.6 |

The catalysts and catalyst masses of this invention when used in the vapor phase oxidation of n-hexane and hydrocarbon products containing predominately n-hexane make it possible to obtain yields of maleic anhydride equivalent to from 40 to 60 parts of maleic acid per 100 parts of hydrocarbon charged at oxidation temperatures of from 400° to 450° C.

Foregoing Examples 12 through 57 have illustrated the catalysts and catalytic masses of this invention as used in the catalytic vapor phase oxidation of benzene and butane to maleic anhydride. As hereinbefore stated, the catalysts and catalytic masses of this invention are useful in the catalytic vapor phase oxidation of materials oxidizable to phthalic anhydride. The following examples will illustrate this use with respect to the oxidation of naphthalene. These catalysts have been prepared by adding to the mixture of metal salts and oxides 80–100 parts of ammonium sulfate or its equivalent as ammonium acid sulfate per mole of vanadium. The carrier was coated by methods described in Examples 1 to 11.

Table V

| Example No. | Catalyst description—Atomic percent | | | | Weight yield percent | |
|---|---|---|---|---|---|---|
| | Percent V | Percent Ti | Percent other | Temp., °C. | Phthalic anhydride | Maleic anhydride |
| 58 | 80 | 10 | 10 Cr | 370 | 87.0 | 7.2 |
| 59 | 80 | 10 | 10 Ca | 370 | 84.0 | 9.6 |
| 60 | 90 | 10 | | 370 | 81.0 | 9.7 |
| 61 | 80 | 10 | 10 Cr | 380 | 87.0 | 7.5 |
| 62 | 80 | 10 | 10 Ca | 390 | 86.0 | 7.0 |
| 63 | 80 | 10 | 10 Co | 400 | 87.0 | 9.5 |
| 64 | 80 | 10 | 10 Al | 410 | 87.5 | 4.1 |
| 65 | 90 | 10 | | 410 | 89.0 | 7.0 |
| 66 | 80 | 10 | 10 Pb | 400 | 90.0 | 7.0 |
| 67 | 88 | 10 | 2 P | 400 | 88.5 | 7.0 |
| 68 | 80 | 10 | 10 Zr | 400 | 82.0 | 10.0 |
| 69 | 90 | 10 | | 400 | 85.0 | 8.1 |
| 70 | 90 | 10 | | 400 | 88.0 | 8.2 |
| 71 | 85 | 10 | 5 P | 440 | 93.0 | 7.0 |
| 72 | 72 | 25 | 3 P | 440 | 91.0 | 8.0 |
| 73 | 73 | 25 | 2 P | 440 | 90.0 | 7.0 |

Catalysts of Example 65 coated on 3/16″ x 3/16″ silicon carbide cylinders. Catalyst of Example 69 on metallic vanadium chips, catalyst of Example 70 on 3/16″ x 3/16″ Alundum cylinders, catalyst of Examples 71 and 72 on stainless steel carrier, and catalyst of Example 73 on 50 mesh silicon carbide pellets. All other catalysts were on silica-glass carriers.

The above yield compares favorably to vanadium containing catalysts heretofore prepared by treating the slurry of metal salts and oxides with sulfur dioxide prior to coating of the carrier. Weight yields from use of such vanadium catalysts have been found to be 80–85 weight percent phthalic anhydride and 6 to 10 weight percent maleic anhydride for the oxidation of naphthalene.

The above catalysts and catalytic masses have been found to be excellent for the vapor phase oxidation of ortho-xylene and mixtures rich in ortho-xylene to phthalic anhydride in weight yields in excess of 80%.

Generally, amounts of ammonium sulfate within the range of from 30 to 200 parts by weight per mole of vanadium in the mixture of metallic compounds can be used, however amounts above or below may be used where desired, e.g. from about 20 to about 300.

As stated above, the second heat treatment procedure may be carried out at a temperature which is sufficient to convert the vanadium and other metallic compounds present, if any, to their respective oxides, but below the melting point of the catalyst mixture. Generally, temperatures in the range of 300° to 600° C. may be employed; however, temperatures in the range of from about 350° to about 450° C. are preferred. While this procedure may be carried out in the absence of oxygen, e.g. where the vanadium or other metallic compound is convertible to its oxides merely on heating, it is preferred that this heating step be carried out under oxidation conditions, the preferred oxygen containing gas for this purpose being air.

As will be understood by those skilled in the art, the catalytic compositions of this invention can be employed in processes in which other materials hereinbefore named, oxidizable to maleic anhydride and/or acid and phthalic anhydride and/or acid are employed. It will also be understood by those skilled in the art that the process for preparing the vanadium containing compositions of this invention can be employed to prepare other catalytic compositions containing vanadium and other catalytic materials where it is ultimately desired to obtain a mixture containing the oxides of the metals in varying valences of the metals. Accordingly, it is not desired that this invention be limited to the specific examples, but rather it is intended that all of these variations apparent to those skilled in the art be included in the spirit and scope of this invention as defined in the appended claims.

This application is a continuation-in-part of application Serial Number 706,287, filed December 31, 1957, now abandoned which is a continuation-in-part of application Serial Number 626,591, filed December 9, 1956, now abandoned, which is a continuation-in-part of application Serial Number 406,580, filed January 27, 1954, now abandoned.

What is claimed is:

1. The process for preparing a vanadium containing catalyst suitable for the vapor phase oxidation of organic chemical compounds oxidizable to a substance selected from the class consisting of maleic and phthalic acids and anhydrides thereof which comprises: preparing a mixture containing vanadium compounds, convertible to oxides of vanadium upon heating, an ammonium sulfate in the proportion of from about 20 to about 300 parts by weight per mole of vanadium and a catalyst carrier and heating the resulting mixture at a temperature sufficient to convert the vanadium compounds to oxides of vanadium.

2. The process for preparing a vanadium-containing catalyst suitable for the vapor phase oxidation of organic chemical compounds oxidizable to an anhydride selected from the class consisting of maleic anhydride and phthalic anhydride which comprises: preparing an aqueous mixture containing compounds of catalytic metals, convertible to their oxides on heating including vanadium in the proportion represented by 10 to 95 atomic percent of vanadium based on the total of the metals present, adding thereto from about 20 to about 300 parts by weight of an ammonium sulfate per mole of vanadium and a catalyst carrier and heating the resulting mixture at a temperature sufficient to convert the vanadium and the other metallic compounds present to their respective oxides.

3. The process for preparing a vanadium-containing catalyst suitable for the vapor phase oxidation of organic chemical compounds oxidizable to an anhydride selected from the class consisting of maleic anhydride and phthalic anhydride which comprises: preparing an aqueous mixture containing compounds of catalytic metals convertible to their oxides on heating including an amount of ammonium metavanadate which is sufficient to provide from 10 to about 95 atomic percent of vanadium based on the total metals present, adding thereto inert carrier particles and from about 30 to about 200 parts by weight of ammonium sulfate per mole of vanadium, heating the resulting mixture to drive off the water and heating the dry mixture at a temperature which is sufficient to convert the vanadium and other metallic compounds present to their respective oxides.

4. The process of claim 3 wherein the second heating step is carried out in the presence of an oxygen containing gas and at a temperature within the range of from about 300 to about 600° C.

5. The process for preparing a vanadium-containing catalys suitable for the vapor phase oxidation of organic chemical compounds oxidizable to an anhydride selected from the class consisting of maleic anhydride and phthalic anhydride which comprises: preparing an aqueous mixture containing compounds of catalytic metals, convertible to their oxides on heating, including vanadium in the proportion represented by 10 to about 95 atomic percent based on the total metals present, adding thereto from about 20 to about 300 parts by weight of an ammonium sulfate per mole of vanadium, coating carrier particles with the resulting mixture and heating the coated carrier particles at a temperature which is sufficient to convert the vanadium and the other metallic compounds present to their respective oxides.

6. The process for preparing a vanadium-containing catalyst suitable for the vapor phase oxidation of organic chemical compounds oxidizable to an anhydride selected from the class consisting of maleic anhydride and phthalic anhydride which comprises: forming an aqueous mixture containing compounds of catalytic metals, convertible to their oxides on heating, including an amount of ammonium metavanadate which is sufficient to provide a vanadium content of from 10 to about 95 atomic percent based on the total metals present and ammonium sulfate in the proportion of from about 30 to about 200 parts by weight per mole of vanadium present, coating carrier particles with said aqueous mixture, heating the coated carrier particles to remove the water and heating the dry coated carrier particles at a temperature which is sufficient to convert the vanadium and the other metallic compounds to their respective oxides.

7. The process for claim 6 wherein the second heating step is carried out in the presence of an oxygen containing gas and at a temperature within the range of from about 300 to about 600° C.

8. The process of claim 7 wherein the oxygen containing gas is air and the temperature employed is within the range of from 350 to 450° C.

9. A catalytic mass for the vapor phase oxidation of an organic chemical compound oxidizable to maleic anhydride prepared according to the process of claim 8.

10. A catalyst for the vapor phase oxidation of an organic chemical compound oxidizable to an anhydride selected from the class consisting of maleic anhydride and phthalic anhydride which comprises a mixture of oxides of vanadium supported on a catalyst carrier, prepared by heating a mixture containing vanadium compounds, convertible to oxides of vanadium on heating, in the presence of from about 20 to about 300 parts by weight of an ammonium sulfate per mole of vanadium said mixture and ammonium sulfate being deposited on a catalyst carrier 11. A catalyst for the vapor phase oxidation of an organic material oxidizable to maleic anhydride which comprises a mixture of oxides of catalytic metals containing oxides of vanadium, prepared by heating an aqueous mixture containing compounds of catalytic metals, convertible to their oxides on heating, including vanadium in the proportion represented by 10 to 95 atomic percent of vanadium based on the total metals present, in the presence of from 30 to 200 parts by weight of an ammonium sulfate per mole of vanadium said mixture and ammonium sulfate being coated on carrier particles.

12. The catalyst of claim 11 wherein the vanadium compound is ammonium metavanadate.

References Cited in the file of this patent
UNITED STATES PATENTS 2,029,376   Joseph _____ Feb. 4, 1936
2,065,394   Punnett _____ Dec. 22, 1936